US012803918B2

(12) United States Patent
Yu et al.

(10) Patent No.: US 12,803,918 B2
(45) Date of Patent: Nov. 17, 2026

(54) NETWORK AND DATA TRANSMISSION METHOD AND APPARATUS

(71) Applicant: HUAWEI TECHNOLOGIES CO., LTD., Shenzhen (CN)

(72) Inventors: Bin Yu, Nanjing (CN); Wenjun Chang, Beijing (CN); Xingjian He, Nanjing (CN); Wei Chen, Nanjing (CN); Donghui Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 606 days.

(21) Appl. No.: 18/148,914

(22) Filed: Dec. 30, 2022

(65) Prior Publication Data

US 2023/0148392 A1 May 11, 2023

Related U.S. Application Data

(63) Continuation of application No. PCT/CN2021/098388, filed on Jun. 4, 2021.

(30) Foreign Application Priority Data

Jun. 30, 2020 (CN) ........................ 202010615469.1

(51) Int. Cl.
*H04L 47/2425* (2022.01)
*H04L 45/302* (2022.01)
(Continued)

(52) U.S. Cl.
CPC ........ *H04L 47/2433* (2013.01); *H04L 45/306* (2013.01); *H04L 47/24* (2013.01);
(Continued)

(58) Field of Classification Search
CPC ............. H04L 47/2433; H04L 47/2408; H04L 47/2475; H04L 47/41; H04L 45/64; H04L 45/306; H04L 47/24; H04L 47/6275
See application file for complete search history.

(56) References Cited

U.S. PATENT DOCUMENTS 6,970,478 B1 11/2005 Nishihara
7,668,161 B2 * 2/2010 Morgan ................ H04L 69/166 370/469
(Continued)

FOREIGN PATENT DOCUMENTS

CN 1731757 A 2/2006
CN 101594289 A 12/2009
(Continued)

OTHER PUBLICATIONS

Tsuchiya, Kuni, "European Search Report", Sep. 9, 2023 EPO, EP Application No. 21832855 (Year: 2023).*
(Continued)

*Primary Examiner* — Ramy M Osman
(74) *Attorney, Agent, or Firm* — Leydig, Voit & Mayer, Ltd.

(57) ABSTRACT

This application discloses a network and a data transmission method and apparatus, and belongs to the field of communication technologies. The network includes a core device and an edge device. The edge device identifies a service type of a first service packet from the core device, and reports a service type identifier of the first packet to the core device. The core device determines a priority corresponding to the service type identifier based on a stored service priority correspondence, and forwards, based on the priority, a service packet belonging to a same service flow as the first service packet. A strong service identification capability of the edge device is used to precisely identify thousands of service types, and a strong entry storage capability of the
(Continued)

core device is used to store a correspondence that records thousands of service types and priorities. This effectively avoids problems such as transmission congestion and a packet loss that are caused by an incapability of precisely identifying a service type and allocation of a same priority to service packets of different service types.

24 Claims, 4 Drawing Sheets

(51) Int. Cl.

| | |
|---|---|
| ***H04L 47/24*** | (2022.01) |
| ***H04L 47/2408*** | (2022.01) |
| ***H04L 47/2475*** | (2022.01) |
| ***H04L 47/41*** | (2022.01) |
| ***H04L 47/6275*** | (2022.01) |

(52) U.S. Cl.

CPC ...... *H04L 47/2408* (2013.01); *H04L 47/2475* (2013.01); *H04L 47/41* (2013.01); *H04L 47/6275* (2013.01)

(56) References Cited

U.S. PATENT DOCUMENTS

| | | | | |
|---|---|---|---|---|
| 7,934,255 | B1 * | 4/2011 | Gyugyi | G06F 21/564 713/188 |
| 10,681,750 | B2 * | 6/2020 | Alper | H04W 8/08 |
| 2005/0025182 | A1 * | 2/2005 | Nazari | H04L 67/04 370/469 |
| 2006/0242710 | A1 * | 10/2006 | Alexander | G09G 5/363 726/24 |
| 2010/0268841 | A1 * | 10/2010 | Xhafa | H04W 72/1215 709/231 |
| 2011/0264822 | A1 * | 10/2011 | Ferguson | H04L 45/60 709/235 |
| 2011/0274108 | A1 * | 11/2011 | Fan | H04L 12/4633 370/389 |
| 2011/0310797 | A1 * | 12/2011 | Kobayashi | H04L 47/6215 370/328 |
| 2012/0054363 | A1 * | 3/2012 | Hart | H04L 12/66 709/232 |
| 2013/0010803 | A1 * | 1/2013 | Yamaguchi | H04L 69/22 370/408 |
| 2014/0067758 | A1 * | 3/2014 | Boldyrev | G06F 9/5088 707/610 |
| 2014/0201738 | A1 * | 7/2014 | Choi | H04L 45/302 718/1 |
| 2014/0363163 | A1 * | 12/2014 | Morper | H04B 10/27 398/58 |
| 2015/0036660 | A1 * | 2/2015 | Bi | H04W 28/0205 370/331 |
| 2019/0044868 | A1 * | 2/2019 | Kfir | H04L 12/2898 |
| 2019/0245782 | A1 * | 8/2019 | Jin | H04L 49/252 |
| 2019/0268266 | A1 * | 8/2019 | Mathison | H04L 45/74 |
| 2019/0280828 | A1 * | 9/2019 | Zhou | H04L 47/6275 |
| 2020/0112523 | A1 * | 4/2020 | Song | H04L 47/24 |
| 2021/0006625 | A1 * | 1/2021 | Migault | H04L 67/568 |
| 2021/0352044 | A1 * | 11/2021 | Asveren | H04L 45/72 |
| 2022/0232423 | A1 * | 7/2022 | Thyagaturu | H04W 28/10 |
| 2023/0148392 | A1 * | 5/2023 | Yu | H04L 47/41 |

FOREIGN PATENT DOCUMENTS

| | | | |
|---|---|---|---|
| CN | 102025620 | A | 4/2011 |
| CN | 102143035 | A | 8/2011 |
| CN | 103701710 | A | 4/2014 |
| CN | 108566341 | A | 9/2018 |
| CN | 109743316 | A | 5/2019 |
| CN | 110740481 | A | 1/2020 |
| EP | 1739914 | A1 | 1/2007 |
| WO | 2018028590 | A1 | 2/2018 |

OTHER PUBLICATIONS

Tsuchiya, Kuni, "European Search Strategy", Sep. 9, 2023 EPO, EP Application No. 21832855 (Year: 2023).*

Tsuchiya, Kuni, "European Written Opinion", Sep. 9, 2023 EPO, EP Application No. 21832855.7 (Year: 2023).*

Haley, Stephen , "European Patent Application No. 21832855.7", Apr. 17, 2024, GJE Intellectual Property (Year: 2024).*

* cited by examiner

NETWORK AND DATA TRANSMISSION METHOD AND APPARATUS

CROSS-REFERENCE TO RELATED APPLICATIONS

This application is a continuation of International Application No. PCT/CN2021/098388, filed on Jun. 4, 2021, which claims priority to Chinese Patent Application No. 202010615469.1, filed on Jun. 30, 2020. The disclosures of the aforementioned applications are hereby incorporated by reference in their entireties.

TECHNICAL FIELD

This application relates to the field of communication technologies, and in particular, to a network and a data transmission method and apparatus.

BACKGROUND

Generally, a campus network may include network devices such as an egress router, a core switch, an aggregation switch, and an access switch. To improve quality of service, in the campus network, service packets of different service types from an application server are differentiated and the service packets are forwarded with different priorities.

Currently, the egress router identifies a service type of a service packet. According to an existing specification, the egress router can identify eight service types, and a corresponding priority is allocated to each service type. The egress router may identify a service type of a service packet from the application server, add a corresponding priority identifier to the service packet based on an identification result, and forward the service packet to a terminal through the core switch, the aggregation switch, the access switch, and the like.

In an actual application, there are hundreds or thousands of service types of service packets that pass through the egress router. However, due to a hardware resource limitation of the egress router, the egress router cannot identify all the service types. Instead, the egress router can identify only eight service types. Consequently, two service packets that actually belong to different services may be identified as being of a same service type and allocated with a same priority. In a subsequent forwarding process of a switch, problems such as congestion and a packet loss may occur because the two service packets have the same priority.

SUMMARY

This application provides a network and a data transmission method and apparatus, to resolve problems such as forwarding congestion and a packet loss in a related technology that are caused when an egress router has an insufficient identification capability and cannot precisely identify a service type. The technical solutions are as follows.

According to a first aspect, a network is provided. The overlay network includes a core device and an edge device. The edge device is configured to identify a service type of a first service packet from the core device, and send a service type identifier to the core device, where the service type identifier is used to identify the service type.

The core device is configured to store a service priority correspondence, determine a priority corresponding to the service type identifier based on the service priority correspondence, and forward a second service packet based on the priority, where the second service packet and the first service packet belong to a same service flow, and the service priority correspondence includes a mapping from a plurality of service types to a plurality of priorities.

In this solution provided in this application, the edge device connected to a small quantity of devices identifies the service type of the first service packet, and synchronizes an identification result to the core device. The core device may store the service priority correspondence, find a priority corresponding to the service type in the service priority correspondence based on the service type of the first service packet reported by the edge device, and forward, based on the priority, a service packet belonging to a same service flow as the first service packet.

In this solution, a strong service identification capability of the edge device is fully used to precisely identify thousands of service types. In addition, a strong entry storage capability of the core device is used to store the service priority correspondence that records a correspondence between thousands of service types and priorities.

In a possible implementation, the edge device is further configured to send a service flow indication of the service flow to which the first service packet belongs.

In this solution provided in this application, the service flow indication may be an identifier of the service flow, or may be a 5-tuple. The 5-tuple includes a destination address, a source address, a destination port number, a source port number, and a transport layer protocol number.

In a possible implementation, the core device is further configured to establish a correspondence between the service flow to which the first service packet belongs and the priority.

In this solution provided in this application, when reporting the service type identifier of the first service packet, the edge device may simultaneously report the service flow indication of the first service packet. In this way, a correspondence between the service flow indication and the priority may be established in the core device. The core device may extract the service flow indication from a received uplink service packet, and may find the priority corresponding to the extracted service flow indication in the stored correspondence between the service flow indication and the priority, to forward the service packet based on the found priority.

In a possible implementation, the edge device is further configured to: if no service packet belonging to the service flow is received within preset duration, send a deletion message to the core device, where the deletion message carries the service flow indication.

In this solution provided in this application, the core device may delete some information in the stored correspondence between the service flow indication and the priority, to save storage resources. The edge device may determine the information to be deleted. If no service packet whose service flow indication is the service flow indication of the first service packet is received within the preset duration, the edge device sends the deletion message to the core device. The deletion message carries the service flow indication of the first service packet. The core device deletes the correspondence between the service flow indication of the first service packet and the priority based on the deletion message. In this mechanism, an access device with a large quantity of idle computing resources determines the information to be deleted, and the core device only needs to perform a corresponding deletion operation after receiving the deletion message. Therefore, computing resources of the core device can be saved. The preset duration may be set based on an actual requirement, for example, 1 minute or 5 minutes.

In a possible implementation, the core device is further configured to delete the correspondence between the service flow and the priority based on the deletion message.

In this solution provided in this application, the core device may delete some information in the stored correspondence between the service flow indication and the priority, to save storage resources. The core device itself may determine the information to be deleted. If no service packet whose service flow indication is the service flow indication of the first service packet is received within the preset duration, the core device deletes the correspondence between the service flow indication of the first service packet and the priority. In this mechanism, the core device itself may delete some information in the correspondence between the service flow indication and the priority without a need to interact with another network device. Therefore, data transmission resources can be saved. The preset duration may be set based on an actual requirement, for example, 1 minute or 5 minutes.

In a possible implementation, the core device is further configured to set a value of a priority field in the second service packet to a value indicating the priority.

In this solution provided in this application, after finding a priority of the second service packet, the core device may set the value of the priority field in the second service packet to the value indicating the priority, and then forward the second service packet. In this way, after receiving the second service packet, the edge device may obtain the value of the priority carried in the second service packet, and forward the second service packet based on the priority identified by the value of the priority.

In a possible implementation, the edge device is further configured to: if a value of a priority field in the second service packet received from the core device belongs to an identification-free set, ignore identification of a service type of the second service packet.

In this solution provided in this application, if the value of the priority field in the second service packet received by the edge device from the core device belongs to the identification-free set, the edge device ignores identification of the service type of the second service packet, and directly forwards the second packet based on the priority identified by the value of the priority field. In this case, because a value of a priority field of a service packet is usually a fixed value when no priority is allocated, if the value of the priority field in the second service packet is a value in the identification-free set, it indicates that a service type of a packet belonging to a same service flow as the second service packet is identified. The identification-free set may be a set including values of priorities other than the fixed value.

In a possible implementation, the edge device is further configured to: if the second service packet received from the core device includes the priority field, ignore identification of a service type of the second service packet.

In this solution provided in this application, when no priority is allocated, if a service packet does not include a priority field, the core device may add the priority field after allocating a priority to the service packet. Correspondingly, after receiving the service packet including the priority field, the edge device may also ignore identification of a service type.

In a possible implementation, the network is an overlay network.

In a possible implementation, the network is a campus network.

According to a second aspect, a data transmission method is provided. The method is applied to an edge device in a network, the overlay network includes a core device and the edge device, and the method includes:

identifying, by the edge device, a service type of a first service packet from the core device, and sending a service type identifier to the core device, where the service type identifier is used to identify the service type, so that the core device determines a priority corresponding to the service type identifier based on a stored service priority correspondence, and forwards a second service packet based on the priority, where the second service packet and the first service packet belong to a same service flow, and the service priority correspondence includes a mapping from a plurality of service types to a plurality of priorities.

In a possible implementation, the method further includes:

if no service packet belonging to the service flow is received within preset duration, sending, by the edge device, a deletion message to the core device, where the deletion message carries a service flow indication.

In a possible implementation, the method further includes:

if the second service packet received from the core device includes a priority field, ignoring, by the edge device, identification of a service type of the second service packet; or if a value of a priority field in the second service packet received from the core device belongs to an identification-free set, ignoring identification of a service type of the second service packet.

According to a third aspect, a data transmission method is provided. The method is applied to a core device in a network, the overlay network includes the core device and an edge device, and the method includes:

receiving, by the core device, a service type identifier from the edge device, where the service type identifier is used to identify a service type of a first service packet received by the edge device from the core device; and determining, by the core device, a priority corresponding to the service type identifier based on a stored service priority correspondence, and forwarding a second service packet based on the priority, where the second service packet and the first service packet belong to a same service flow, and the service priority correspondence includes a mapping from a plurality of service types to a plurality of priorities.

In a possible implementation, the method further includes:

receiving, by the core device from the edge device, a service flow indication of the service flow to which the first service packet belongs; and establishing, by the core device, a correspondence between the service flow to which the first service packet belongs and the priority.

In a possible implementation, the method further includes:

receiving, by the core device, a deletion message from the edge device, where the policy deletion message carries the service flow indication; and deleting, by the core device, the correspondence between the service flow to which the first service packet belongs and the priority.

In a possible implementation, the method further includes:

if no service packet belonging to the service flow is received within preset duration, deleting, by the core device, the correspondence between the service flow and the priority.

According to a fourth aspect, a data transmission apparatus is provided. The apparatus is used in an edge device in a network, the overlay network includes a core device and a plurality of edge devices, and the apparatus includes:

an identification module, configured to identify a service type of a first service packet from the core device; and a sending module, configured to send a service type identifier to the core device, where the service type identifier is used to identify the service type, so that the core device determines a priority corresponding to the service type identifier based on a stored service priority correspondence, and forwards a second service packet based on the priority, where the second service packet and the first service packet belong to a same service flow, and the service priority correspondence includes a mapping from a plurality of service types to a plurality of priorities.

In a possible implementation, the sending module is further configured to:

if no service packet belonging to the service flow is received within preset duration, send a deletion message to the core device, where the deletion message carries a service flow indication.

In a possible implementation, the apparatus further includes:

a receiving module, configured to: if the second service packet received from the core device includes a priority field, ignore identification of a service type of the second service packet; or if a value of a priority field in the second service packet received from the core device belongs to an identification-free set, ignore identification of a service type of the second service packet.

According to a fifth aspect, a data transmission apparatus is provided. The apparatus is used in a core device in a network, the network includes the core device and a plurality of edge devices, and the apparatus includes:

a receiving module, configured to receive a service type identifier from the edge device, where the service type identifier is used to identify a service type of a first service packet received by the edge device from the core device; and a determining module, configured to determine a priority corresponding to the service type identifier based on a stored service priority correspondence, and forward a second service packet based on the priority, where the second service packet and the first service packet belong to a same service flow, and the service priority correspondence includes a mapping from a plurality of service types to a plurality of priorities.

In a possible implementation, the receiving module is further configured to:

receive, from the edge device, a service flow indication of the service flow to which the first service packet belongs; and the apparatus further includes:

an establishment module, configured to establish a correspondence between the service flow to which the first service packet belongs and the priority.

In a possible implementation, the receiving module is further configured to:

receive a deletion message from the edge device, where the policy deletion message carries the service flow indication; and delete the correspondence between the service flow to which the first service packet belongs and the priority.

In a possible implementation, the apparatus further includes:

a deletion module, configured to: if no service packet belonging to the service flow is received within preset duration, delete the correspondence between the service flow and the priority.

According to a sixth aspect, an edge device is provided. The edge device includes a processor and a memory, the memory stores a program, and the processor is configured to invoke the program stored in the memory, so that the edge device performs the data transmission method according to the second aspect.

According to a seventh aspect, a core device is provided. The core device includes a processor and a memory, the memory stores a program, and the processor is configured to invoke the program stored in the memory, so that the core device performs the data transmission method according to the third aspect.

According to an eighth aspect, a computer-readable storage medium is provided. The computer-readable storage medium stores a computer program. When the computer program is run on a network device, the network device is enabled to perform the network configuration method according to the first aspect or the second aspect.

According to a ninth aspect, a computer program product including instructions is provided. When the computer program product runs on a network device, the network device is enabled to perform the network configuration method according to the first aspect or the second aspect.

The technical solutions provided in this application bring the following beneficial effects:

In embodiments of this application, an edge device identifies a service type of a service packet of a service flow, and reports the service type corresponding to the service flow to a core device. Because each edge device is connected to a small quantity of terminals, the edge device may have sufficient hardware resources to precisely identify a service type. When forwarding another service packet of a session, the core device does not need to identify a service type of the service packet, but only needs to allocate a priority to the service packet and forward the service packet. In conclusion, in this application, service type identification and priority allocation are implemented in different devices, so that a service type of a service packet can be precisely identified, and a corresponding priority can be allocated to the service packet. In this way, service packets of different services are not identified as being of a same service type, and problems such as congestion and a packet loss that are caused by identifying service packets of different services as being of a same service type can be effectively reduced.

DESCRIPTION OF EMBODIMENTS

Figure 1:
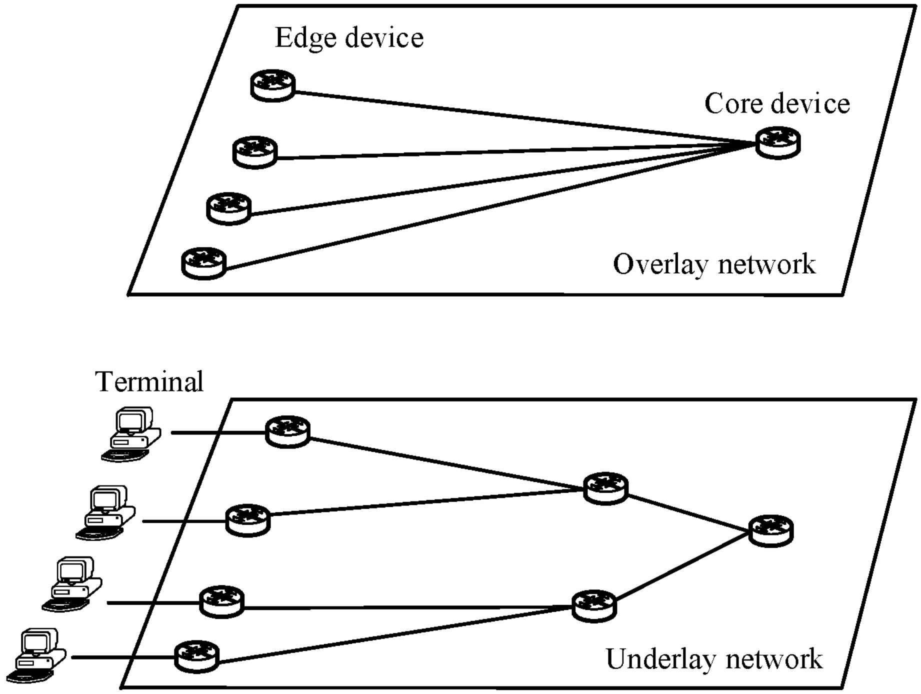
FIG. 1 is a schematic diagram of a campus network according to an embodiment of this application.

An embodiment of this application provides a data transmission method. The method may be applied to a network. The network may be a campus network. During construction of the campus network, an overlay network may be established on an underlay (underlay) physical network. The overlay network may also be referred to as an upper-layer (overlay) network, a virtual network, or the like. As shown in FIG. 1, in the overlay network in this embodiment of this application, network devices may be classified into two categories. One category is a core device, and the core device may correspond to a core switch, an egress router, or the like in the underlay network. The other category is an edge device, the edge device is a network device configured to access a user-side terminal, and may correspond to an access device of the underlay network, for example, an access switch or an access point (Access Point, AP).

Figure 2:
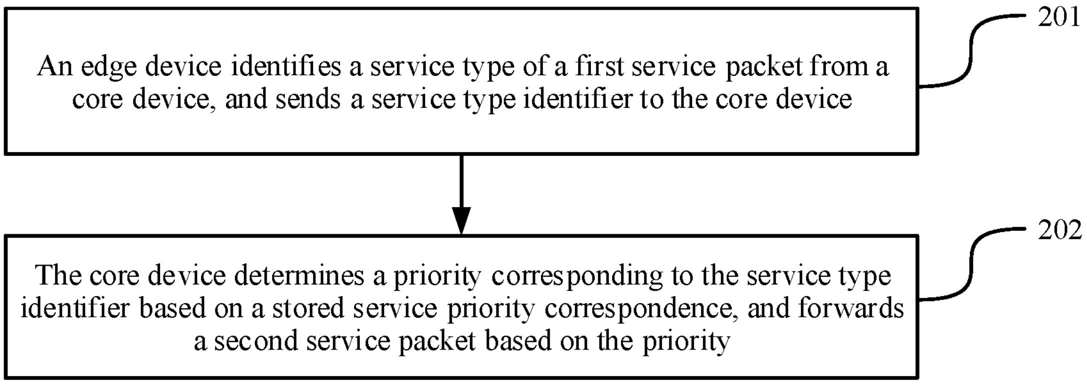
FIG. 2 is a flowchart of a data transmission method according to an embodiment of this application.

A data transmission method provided in an embodiment of this application may be applied to the foregoing overlay network, and is jointly implemented by the edge device and the core device in the overlay network. With reference to FIG. 2, the data transmission method provided in this embodiment of this application may include the following processing procedure:

Step 201: The edge device identifies a service type of a first service packet from the core device, and sends a service type identifier to the core device.

The service type identifier is used to identify the service type, and the first service packet may be the $1^{st}$ service packet, in a downlink service flow, received by the edge device. The downlink service flow is a service flow sent by a server to a terminal.

During implementation, the terminal in the campus network may interact with the server. The server may send a service flow to the terminal, and the service flow includes a plurality of service packets. A service packet sent by an application server to the terminal needs to be forwarded by the core device to the edge device, and then forwarded by the edge device to the corresponding terminal.

After receiving the first service packet in the service flow, the edge device may identify the service type of the first service packet. Specifically, the edge device may store a correspondence between service feature information and a service type identifier. The correspondence between service feature information and a service type identifier may be shown in Table 1 below:

TABLE 1

| Service feature information | Service type identifier |
|---|---|
| A | 1 |
| B | 2 |
| C | 3 |
| . . . | . . . |

After receiving the first service packet, the edge device may find an application layer field of the first service packet, and extract service feature information from the first service packet. Then, the edge device determines, in the stored correspondence between service feature information and a service type identifier, the service type identifier used to identify the service type of the first service packet.

For example, if the service feature information of the first service packet extracted by the edge device is “A”, the edge device may determine, by looking up Table 1, that the service type identifier used to identify the service type of the first service packet is “1”.

After determining the service type identifier used to identify the service type of the first service packet, the edge device may send the service identifier to the core device. In a possible implementation, when the service type identifier is sent, the service type identifier may be encapsulated in a service type synchronization message for sending.

Step 202: The core device determines a priority corresponding to the service type identifier based on a stored service priority correspondence, and forwards a second service packet based on the priority.

The second service packet and the first service packet belong to a same service flow, and the service priority correspondence includes a mapping from a plurality of service types to a plurality of priorities.

During implementation, the core device receives the service type synchronization message from the edge device. When receiving a service packet, the core device may first determine a service flow to which the service packet belongs. If the service packet and the first service packet corresponding to the service type identifier belong to a same service flow, the core device may allocate a priority to the service packet based on the stored service priority correspondence.

The service priority correspondence may be represented by a correspondence between a service type identifier and a value of a priority, as shown in Table 2 below:

TABLE 2

| Service type identifier | Value of a priority |
|---|---|
| 1 | 0 |
| 2 | 1 |
| 3 | 2 |
| . . . | . . . |

To distinguish from the first service packet, the foregoing service packet belonging to the same service flow as the first service packet is referred to as the second service packet below.

The following describes a method in which the core device determines that the second service packet and the first service packet belong to the same service flow.

When receiving the service packet, the edge device may extract a service flow indication from the service packet. Correspondingly, when sending the service type identifier to the core device, the edge device may send the service type identifier together with the service flow indication to the core information. The service flow indication may be a 5-tuple extracted from the first service packet, or may be an identifier used to identify the service flow. The 5-tuple includes a destination address, a source address, a destination port number, a source port number, and a transport layer protocol number. When receiving the second service packet, the core device may extract a service flow indication from the second service packet. If the service flow indication extracted from the second service packet is the same as the service flow indication of the first service packet sent by the edge device, the core device may determine that the second service packet and the first service packet belong to the same service flow.

When the edge device sends the service type identifier to the core device by using the service type synchronization message, the service flow indication of the first service packet may also be carried in the service type synchronization message. The service type synchronization message carrying the service type identifier and the service flow indication may be in a packet format shown in Table 3 below, where an example in which the service flow indication is the 5-tuple is used:

TABLE 3

| | |
|---|---|
| Action (Action) | |
| Service type (Apptype) | |
| Transport layer protocol number | |
| Source port number | Destination port number |
| Destination address | |
| Source address | |
| Type (Type) | Packet length (Len) |
| Core device address | |
| Edge device address | |
| Transport layer | |

Meanings of the fields are as follows:

The edge device address field occupies 4 bytes, and represents an internet protocol (Internet Protocol, IP) address of the edge device.

The core device address field occupies 4 bytes, and identifies an IP address of the core device.

The Type field occupies 2 bytes, where a specified value of 1 indicates that a packet is used for service type synchronization.

The Len field occupies 2 bytes, and represents a total length of the packet.

The source address field occupies 4 bytes, and represents a source IP address of the service packet.

The destination address field occupies 4 bytes, and represents a destination IP address of the service packet.

The source port number field occupies 4 bytes, and represents a port number of a source end of the service packet.

The destination port number field occupies 4 bytes, and represents a port number of a destination end of the service packet.

The transport layer protocol number field occupies 4 bytes, and represents a protocol number of a protocol used at a transport layer.

The Apptype field represents the service type identifier.

For the Action field, a specified value of 1 indicates that the packet is used to add a policy, and a value of this field is 1 in the foregoing service type synchronization message.

The following describes a method in which the core device allocates a priority to the second service packet.

With reference to the foregoing method in which the core device determines that the second service packet and the first service packet belong to the same service flow, after receiving the service flow indication and the service type identifier that are sent by the edge device, the core device may query the stored service priority correspondence, to obtain a value of the priority corresponding to the service type identifier. Then, the core device may add a correspondence between the service flow indication and the value of the priority to a local correspondence between a service flow and a priority. The correspondence between a service flow and a priority may be shown in Table 4 below:

TABLE 4

| Service flow indication | Value of a priority |
|---|---|
| a | 1 |
| b | 2 |
| c | 3 |
| . . . | . . . |

After determining the service flow indication of the second service packet, the core device may find, in the correspondence between a service flow and a priority, a value of a priority corresponding to the service flow indication of the second service packet. The priority identified by the found value of the priority corresponding to the service flow indication of the second service packet is the priority allocated to the second service packet.

Because the second service packet and the first service packet belong to the same service flow, the priority corresponding to the second service packet is the same as the priority corresponding to the first service.

In a possible implementation, before forwarding the second service packet, the core device may set a value of a priority field in the second service packet to a value indicating the priority. Setting herein may include modification or addition. In this way, after receiving the second service packet, the edge device may forward the second service packet to the terminal based on the priority identified by the priority carried in the second service packet.

Correspondingly, if the value of the priority field in the second service packet received by the edge device from the core device belongs to an identification-free set, the edge device ignores identification of a service type of the second service packet, and directly forwards the second packet based on the priority identified by the value of the priority field. In this case, because a value of a priority field of a service packet is usually a fixed value when no priority is allocated, if the value of the priority field in the second service packet is a value in the identification-free set, it indicates that a service type of a packet belonging to a same service flow as the second service packet is identified. The identification-free set may be a set including values of priorities other than the fixed value.

In a possible implementation, the core device may delete some information in the stored correspondence between a service flow and a priority, to save storage resources. Correspondingly, the following two deletion mechanisms may be used:

Mechanism 1: If the core device does not receive, within preset duration after a most recent time of receiving a service packet whose service flow indication is a target service flow indication, a service packet whose service flow indication is the target service flow indication, the core device deletes a correspondence between the target service flow indication and a value of a priority. In this mechanism, the core device itself may delete some information in the correspondence between a service flow and a priority without a need to interact with another network device. Therefore, data transmission resources can be saved. The preset duration may be set based on an actual requirement, for example, 1 minute or 5 minutes.

Mechanism 2: If the edge device does not receive, within preset duration after a most recent time of receiving a service packet whose service flow indication is a target service flow indication, a service packet whose service flow indication is the target service flow indication, the edge device sends a deletion message to the core device, where the deletion message carries the target service flow indication. The core device deletes a correspondence between the target service flow indication and a value of a priority based on the deletion message. In this mechanism, an access device with a large quantity of idle computing resources determines the information to be deleted, and the core device only needs to perform a corresponding deletion operation after receiving the policy deletion message. Therefore, computing resources of the core device can be saved. The preset duration may be set based on an actual requirement, for example, 1 minute or 5 minutes.

In the mechanism 2, the deletion message sent by the edge device to the core device may be in a packet format the same as the packet format shown in Table 3, provided that a specified value of an Action field in the packet format is filled with 0, and other fields are added based on an actual situation. Certainly, the packet format of the deletion message may alternatively be obtained by deleting the Apptype field on the basis of the packet format shown in Table 3, where a specified value of an Action field in the packet format is filled with 0, and other fields are added based on an actual situation. The packet format of the deletion message obtained after the Apptype field is deleted may be shown in Table 5 below:

TABLE 5

| | |
|---|---|
| Action | |
| Transport layer protocol number | |
| Source port number | Destination port number |
| Destination address | |
| Source address | |
| Type | Len |
| Core device address | |
| Edge device address | |
| Transport layer | |

It should be noted that meanings of the fields in Table 5 are the same as the meanings of the fields in Table 3, and details are not described herein again.

In this embodiment of this application, the edge device identifies a service type of a service packet of a service flow, and reports the service type corresponding to the service flow to the core device. Because each edge device is connected to a small quantity of terminals, the edge device may have sufficient hardware resources to precisely identify a service type. When forwarding another service packet of a session, the core device does not need to identify a service type of the service packet, but only needs to allocate a priority to the service packet and forward the service packet. In conclusion, in this application, service type identification and priority allocation are implemented in different devices, so that a service type of a service packet can be precisely identified, and a corresponding priority can be allocated to the service packet. In this way, service packets of different services are not identified as being of a same service type, and problems such as congestion and a packet loss that are caused by identifying service packets of different services as being of a same service type can be effectively reduced.

Figure 3:
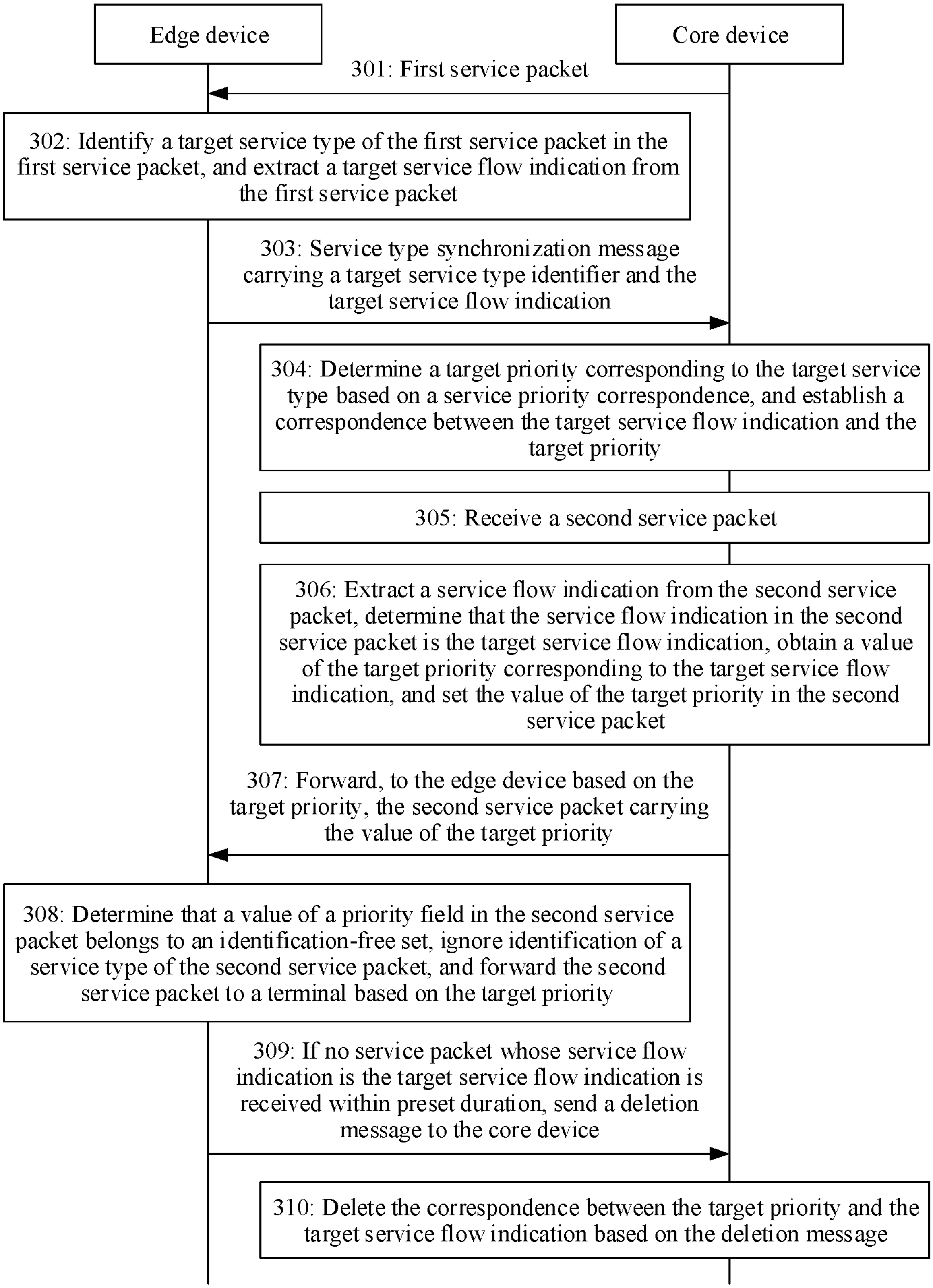
FIG. 3 is a flowchart of a data transmission method according to an embodiment of this application.

With reference to FIG. 3, an embodiment of this application further provides a data transmission method. A processing procedure of the method may include the following steps.

Step 301: An edge device receives a first service packet from a core device.

Step 302: The edge device identifies a target service type of the first service packet in the first service packet, and extracts a target service flow indication from the first service packet.

Step 303: The edge device sends a service type synchronization message to the core device.

The service type synchronization message carries a target service type identifier and the target service flow indication, and the target service type identifier is used to identify the target service type.

Step 304: The core device determines a target priority corresponding to the target service type based on a service priority correspondence, and establishes a correspondence between the target service flow indication and the target priority.

Step 305: The core device receives a second service packet.

Step 306: The core device extracts a service flow indication from the second service packet, determines that the service flow indication in the second service packet is the target service flow indication, obtains a value of the target priority corresponding to the target service flow indication, and sets the value of the target priority in the second service packet.

Step 307: The core device forwards, to the edge device based on the target priority, the second service packet carrying the value of the target priority.

Step 308: The edge device determines that a value of a priority field in the second service packet belongs to an identification-free set, ignores identification of a service type of the second service packet, and forwards the second service packet to a terminal based on the target priority.

Step 309: If no service packet whose service flow indication is the target service flow indication is received within preset duration, the edge device sends a deletion message to the core device.

The deletion message carries the target service flow indication.

Step 310: The core device deletes the correspondence between the target priority and the target service flow indication based on the deletion message.

It should be noted that specific implementations of operations performed by the edge device and the core device in a method procedure shown in FIG. 3 are the same as specific implementations of operations performed by the edge device and the core device in a method procedure shown in FIG. 2, and details are not described herein again.

In this embodiment of this application, the edge device identifies a service type of a service packet of a service flow, and reports the service type corresponding to the service flow to the core device. Because each edge device is connected to a small quantity of terminals, the edge device may have sufficient hardware resources to precisely identify a service type. When forwarding another service packet of a session, the core device does not need to identify a service type of the service packet, but only needs to allocate a priority to the service packet and forward the service packet. In conclusion, in this application, service type identification and priority allocation are implemented in different devices, so that a service type of a service packet can be precisely identified, and a corresponding priority can be allocated to the service packet. In this way, service packets of different services are not identified as being of a same service type, and problems such as congestion and a packet loss that are caused by identifying service packets of different services as being of a same service type can be effectively reduced.

Figure 4:
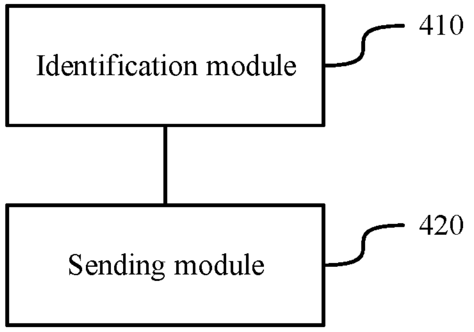
FIG. 4 is a schematic diagram of a structure of a data transmission apparatus according to an embodiment of this application.

Based on a same technical concept, an embodiment of this application further provides a data transmission apparatus. The apparatus is used in an edge device in a network, and the network includes a core device and the edge device. As shown in FIG. 4, the apparatus includes:

an identification module 410, configured to identify a service type of a first service packet from the core device, where the identification module 410 may specifically implement an identification function mentioned in step 201 and other implicit steps; and a sending module 420, configured to send a service type identifier to the core device, where the service type identifier is used to identify the service type, so that the core device determines a priority corresponding to the service type identifier based on a stored service priority correspondence, and forwards a second service packet based on the priority, where the second service packet and the first service packet belong to a same service flow, and the service priority correspondence includes a mapping from a plurality of service types to a plurality of priorities, where the sending module 420 may specifically implement a sending function mentioned in step 201 and other implicit steps.

In a possible implementation, the sending module 420 is further configured to: if no service packet belonging to the service flow is received within preset duration, send a deletion message to the core device, where the deletion message carries a service flow indication.

In a possible implementation, the apparatus further includes:

a receiving module, configured to: if the second service packet received from the core device includes a priority field, ignore identification of a service type of the second service packet; or if a value of a priority field in the second service packet received from the core device belongs to an identification-free set, ignore identification of a service type of the second service packet.

In this embodiment of this application, the edge device identifies a service type of a service packet of a service flow, and reports the service type corresponding to the service flow to the core device. Because each edge device is connected to a small quantity of terminals, the edge device may have sufficient hardware resources to precisely identify a service type. When forwarding another service packet of a session, the core device does not need to identify a service type of the service packet, but only needs to allocate a priority to the service packet and forward the service packet. In conclusion, in this application, service type identification and priority allocation are implemented in different devices, so that a service type of a service packet can be precisely identified, and a corresponding priority can be allocated to the service packet. In this way, service packets of different services are not identified as being of a same service type, and problems such as congestion and a packet loss that are caused by identifying service packets of different services as being of a same service type can be effectively reduced.

It should be noted that: When the data transmission apparatus provided in the foregoing embodiment performs data transmission, division into the foregoing functional modules is merely used as an example for description. During actual application, the foregoing functions may be allocated to different functional modules for implementation based on a requirement. In other words, an inner structure of the edge device is divided into different functional modules to implement all or some of the functions described above. In addition, the data transmission apparatus provided in the foregoing embodiment is based on a same concept as the embodiments of the data transmission methods. For a specific implementation process, refer to the method embodiments. Details are not described herein again.

Figure 5:
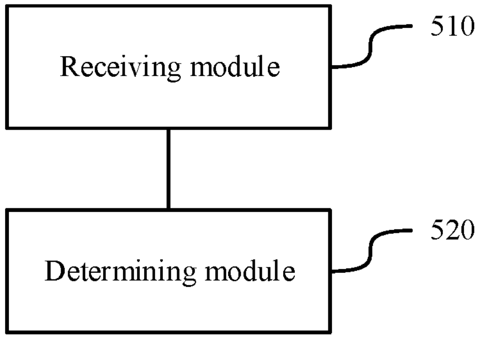
FIG. 5 is a schematic diagram of a structure of a data transmission apparatus according to an embodiment of this application.

Based on a same technical concept, an embodiment of this application further provides a data transmission apparatus. The apparatus is used in a core device in a network, and the network includes the core device and an edge device. As shown in FIG. 5, the apparatus includes:

a receiving module 510, configured to receive a service type identifier from the edge device, where the service type identifier is used to identify a service type of a first service packet received by the edge device from the core device, where the receiving module 510 may specifically implement a receiving function of the core device mentioned in step 201 and other implicit steps; and a determining module 520, configured to determine a priority corresponding to the service type identifier based on a stored service priority correspondence, and forward a second service packet based on the priority, where the second service packet and the first service packet belong to a same service flow, and the service priority correspondence includes a mapping from a plurality of service types to a plurality of priorities, where the determining module 520 may specifically implement a determining function of the core device mentioned in step 202 and other implicit steps.

In a possible implementation, the receiving module 510 is further configured to:

receive, from the edge device, a service flow indication of the service flow to which the first service packet belongs; and the apparatus further includes:

an establishment module, configured to establish a correspondence between the service flow to which the first service packet belongs and the priority.

In a possible implementation, the receiving module 510 is further configured to:

receive a deletion message from the edge device, where the policy deletion message carries the service flow indication, and delete the correspondence between the service flow to which the first service packet belongs and the priority.

In a possible implementation, the apparatus further includes:

a deletion module, configured to: if no service packet belonging to the service flow is received within preset duration, delete the correspondence between the service flow and the priority.

In this embodiment of this application, the edge device identifies a service type of a service packet of a service flow, and reports the service type corresponding to the service flow to the core device. Because each edge device is connected to a small quantity of terminals, the edge device may have sufficient hardware resources to precisely identify a service type. When forwarding another service packet of a session, the core device does not need to identify a service type of the service packet, but only needs to allocate a priority to the service packet and forward the service packet. In conclusion, in this application, service type identification and priority allocation are implemented in different devices, so that a service type of a service packet can be precisely identified, and a corresponding priority can be allocated to the service packet. In this way, service packets of different services are not identified as being of a same service type, and problems such as congestion and a packet loss that are caused by identifying service packets of different services as being of a same service type can be effectively reduced.

It should be noted that: When the data transmission apparatus provided in the foregoing embodiment performs data transmission, division into the foregoing functional modules is merely used as an example for description. During actual application, the foregoing functions may be allocated to different functional modules for implementation based on a requirement. In other words, an inner structure of the core device is divided into different functional modules to implement all or some of the functions described above. In addition, the data transmission apparatus provided in the foregoing embodiment is based on a same concept as the embodiments of the data transmission methods. For a specific implementation process, refer to the method embodiments. Details are not described herein again.

Figure 6:
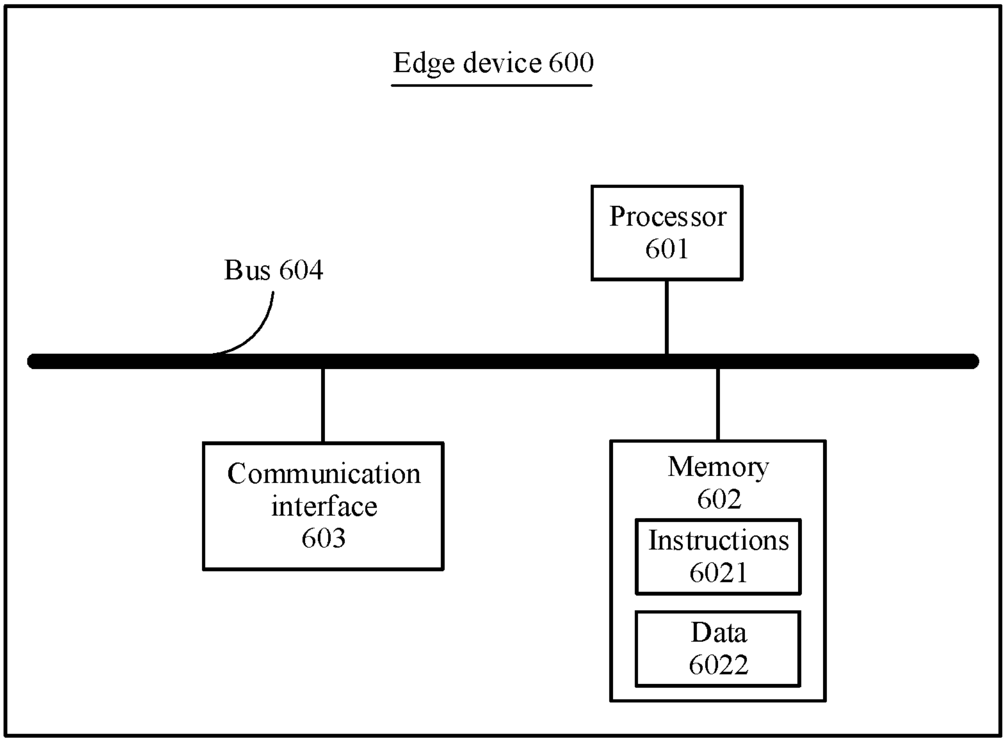
FIG. 6 is a schematic diagram of a structure of an edge device according to an embodiment of this application.

An embodiment of this application further provides an edge device. As shown in FIG. 6, the edge device 600 includes a processor 601, a memory 602, a communication interface 603, and a bus 604. The processor 601, the memory 602, and the communication interface 603 are communicatively connected with each other using the bus 604. A person skilled in the art should understand that a connection manner between the processor 601, the memory 602, and the communication interface 603 shown in FIG. 6 is merely an example. In an implementation process, the processor 601, the memory 602, and the communication interface 603 may alternatively be communicatively connected with each other in another connection manner other than using the bus 604.

The memory 602 is configured to store instructions 6021 and data 6022. The memory 602 may be various types of storage media. For example, the memory 602 may be a random access memory (random access memory, RAM), a read-only memory (read-only memory, ROM), a non-volatile RAM (non-volatile RAM, NVRAM), a programmable ROM (programmable ROM, PROM), an erasable PROM (erasable PROM, EPROM), an electrically erasable PROM (electrically erasable PROM, EEPROM), a flash memory, an optical memory, a register, or the like. In addition, the memory 602 may include a hard disk and/or an internal storage.

The processor 601 may be a general-purpose processor, and the general-purpose processor may be a processor that performs a specific step and/or operation by reading and executing instructions (for example, the instructions 6021) stored in a memory (for example, the memory 602). In a process of performing the foregoing step and/or operation, the general-purpose processor may use data (for example, the data 6022) stored in the memory (for example, the memory 602). The general-purpose processor may be, for example, but is not limited to, a central processing unit (central processing unit, CPU). In addition, the processor 601 may alternatively be a dedicated processor. The dedicated processor may be a specially designed processor configured to perform a specific step and/or operation. For example, the dedicated processor may be, but is not limited to, a digital signal processor (digital signal processor, DSP), an application-specific integrated circuit (application-specific integrated circuit, ASIC), or a field-programmable gate array (field-programmable gate array, FPGA). In addition, the processor 601 may alternatively be a combination of a plurality of processors, for example, a multi-core processor. The processor 601 may include one or more circuits, to perform all or some of the steps of the data transmission method provided in the foregoing embodiments.

The communication interface 603 may include interfaces configured to implement interconnection between components inside the edge device 600, such as an input/output (input/output, I/O) interface, a physical interface, and a logical interface, and an interface configured to implement interconnection between the edge device 600 and another device (for example, a network device or a workstation). The physical interface may be a gigabit ethernet (gigabit ethernet, GE) interface, and may be configured to implement interconnection between the edge device 600 and another device (for example, a network device or a workstation). The logical interface is an internal interface of the edge device 600, and may be configured to implement interconnection between components inside the edge device 600. It is easy to understand that the edge device 600 may communicate with another network device and/or workstation through the communication interface 603. For example, a message is sent and received between the edge device 600 and the another network device through the communication interface 603.

The bus 604 may be any type of communication bus, for example, a system bus, configured to implement interconnection between the processor 601, the memory 602, and the communication interface 603.

The foregoing components may be separately disposed on chips that are independent of each other, or at least some or all of the components may be disposed on a same chip. Whether the components are separately disposed on different chips or are integrated and disposed on one or more chips usually depends on a requirement of product design. This embodiment of this application imposes no limitation on specific implementations of the foregoing components.

Figure 7:
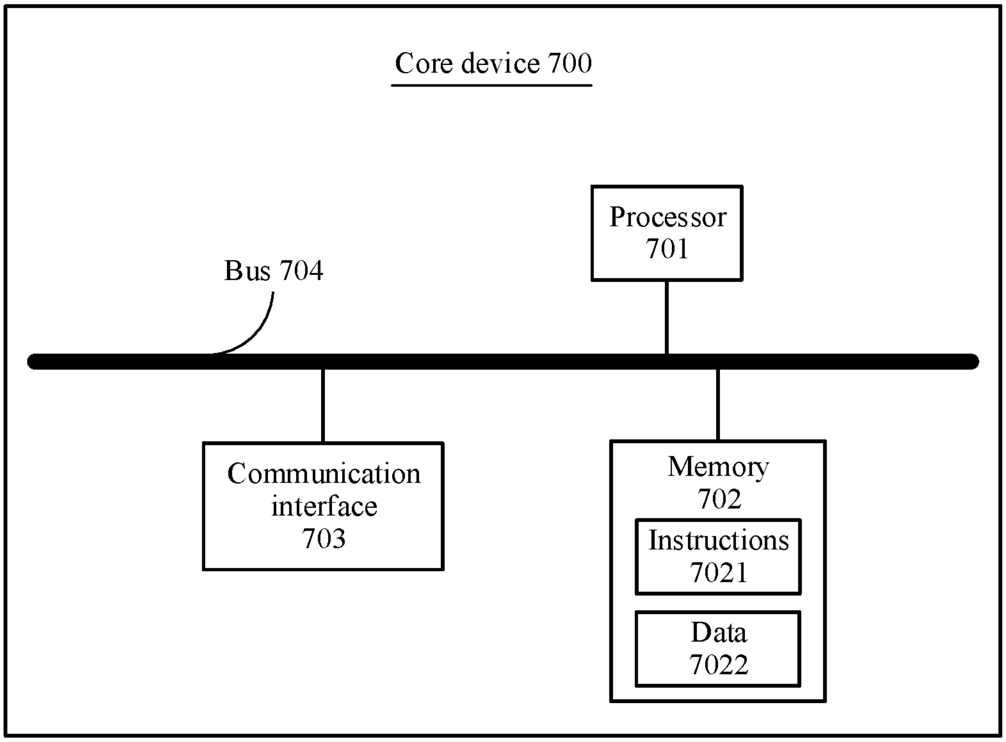
FIG. 7 is a schematic diagram of a structure of a core device according to an embodiment of this application.

An embodiment of this application further provides a core device. As shown in FIG. 7, the core device 700 includes a processor 701, a memory 702, a communication interface 703, and a bus 704. The processor 701, the memory 702, and the communication interface 703 are communicatively connected with each other using the bus 704. A person skilled in the art should understand that a connection manner between the processor 701, the memory 702, and the communication interface 703 shown in FIG. 7 is merely an example. In an implementation process, the processor 701, the memory 702, and the communication interface 703 may alternatively be communicatively connected with each other in another connection manner other than using the bus 704.

The memory 702 is configured to store instructions 7021 and data 7022. The memory 702 may be various types of storage media. For example, the memory 702 may be a random access memory (random access memory, RAM), a read-only memory (read-only memory, ROM), a non-volatile RAM (non-volatile RAM, NVRAM), a programmable ROM (programmable ROM, PROM), an erasable PROM (erasable PROM, EPROM), an electrically erasable PROM (electrically erasable PROM, EEPROM), a flash memory, an optical memory, a register, or the like. In addition, the memory 702 may include a hard disk and/or an internal storage.

The processor 701 may be a general-purpose processor, and the general-purpose processor may be a processor that performs a specific step and/or operation by reading and executing instructions (for example, the instructions 7021) stored in a memory (for example, the memory 702). In a process of performing the foregoing step and/or operation, the general-purpose processor may use data (for example, the data 7022) stored in the memory (for example, the memory 702). The general-purpose processor may be, for example, but is not limited to, a central processing unit (central processing unit, CPU). In addition, the processor 701 may alternatively be a dedicated processor. The dedicated processor may be a specially designed processor configured to perform a specific step and/or operation. For example, the dedicated processor may be, but is not limited to, a digital signal processor (digital signal processor, DSP), an application-specific integrated circuit (application-specific integrated circuit, ASIC), or a field programmable gate array (field programmable gate array, FPGA). In addition, the processor 701 may alternatively be a combination of a plurality of processors, for example, a multi-core processor. The processor 701 may include one or more circuits, to perform all or some of the steps of the data transmission method provided in the foregoing embodiments.

The communication interface 703 may include interfaces configured to implement interconnection between components inside the core device 700, such as an input/output (input/output, I/O) interface, a physical interface, and a logical interface, and an interface configured to implement interconnection between the core device 700 and another device (for example, a network device or a workstation). The physical interface may be a gigabit ethernet (gigabit ethernet, GE) interface, and may be configured to implement interconnection between the core device 700 and another device (for example, a network device or a workstation). The logical interface is an internal interface of the core device 700, and may be configured to implement interconnection between components inside the core device 700. It is easy to understand that the core device 700 may communicate with another network device and/or workstation through the communication interface 703. For example, a message is sent and received between the core device 700 and the another network device through the communication interface 703.

The bus 704 may be any type of communication bus, for example, a system bus, configured to implement interconnection between the processor 701, the memory 702, and the communication interface 703.

The foregoing components may be separately disposed on chips that are independent of each other, or at least some or all of the components may be disposed on a same chip. Whether the components are separately disposed on different chips or are integrated and disposed on one or more chips usually depends on a requirement of product design. This embodiment of this application imposes no limitation on specific implementations of the foregoing components.

All or some of the foregoing embodiments may be implemented by software, hardware, firmware, or any combination thereof. When the embodiments are implemented by software, all or some of the embodiments may be implemented in a form of a computer program product. The computer program product includes one or more computer instructions. When the computer program instructions are loaded and executed on a device, the procedures or functions according to embodiments of this application are all or partially generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, such as a server or a data center, integrating one or more usable media. The usable medium may be a magnetic medium (for example, a floppy disk, a hard disk, or a magnetic tape), an optical medium (for example, a digital video disc (Digital Video Disc, DVD)), a semiconductor medium (for example, a solid-state drive).

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A network system, comprising:

a core device; and an edge device, wherein the edge device comprises a first processor and a first non-transitory computer-readable medium including computer-executable instructions that, when executed by the first processor, facilitate carrying out first operations comprising:

receiving, from the core device, a first service packet including a service feature information;

extracting, from the first service packet, the service feature information;

determining, based on the service feature information extracted from the first service packet, a service type identifier that is used to identify a service type of the first service packet; and sending, to the core device, the service type identifier;

wherein the core device comprises a second processor and a second non-transitory computer-readable medium including computer-executable instructions that, when executed by the second processor, facilitate carrying out second operations comprising:

storing, at the core device, a plurality of service priority correspondence entries, each correspondence entry indicating a mapping of a service type identifier value and a corresponding priority value;

receiving the service type identifier that is used to identify the service type of the first service packet;

determining, in accordance with the plurality of service priority correspondence entries and the received service type identifier, a priority value corresponding to the received service type identifier; and forwarding, based on the priority value corresponding to the received service type identifier, a second service packet belonging to a same service flow as the first service packet, wherein the second operations comprise establishing a correspondence between the service flow to which the first service packet belongs and the priority value.

2. The network system according to claim 1, wherein the first operations comprise sending, to the core device, a service flow indication of the service flow to which the first service packet belongs.

3. The network system according to claim 1, wherein the first operations comprise:

sending, in accordance with no service packet belonging to the service flow being received within preset duration, a deletion message to the core device, wherein the deletion message carries the service flow indication.

4. The network system according to claim 3, wherein the second operations comprise deleting, in accordance with receiving the deletion message, the correspondence between the service flow and the priority value.

5. The network system according to claim 1, wherein the first operations comprise:

deleting, in accordance with no service packet belonging to the service flow being received within a preset duration, the correspondence between the service flow and the priority value.

6. The network system according to claim 1, wherein the second operations comprise:

setting a value of a priority field in the second service packet to a value indicating the priority value.

7. The network system according to claim 6, wherein the first operations comprise:

ignoring, in accordance with the second service packet comprising the priority field, identification of a service type of the second service packet.

8. The network system according to claim 1, wherein the first operations comprise:

ignoring, in accordance with a value of a priority field in the second service packet belonging to an identification-free set, identification of a service type of the second service packet.

9. The network system according to claim 1, wherein a network of the network system is an overlay network.

10. The network system according to claim 1, wherein a network of the network system is a campus network.

11. The network system according to claim 1, wherein the service type identifier corresponds to an Apptype.

12. The network system according to claim 11, wherein the service type identifier is provided in an Apptype field of a service type synchronization message sent by the edge device during the sending operation.

13. A data transmission method, wherein the method is applied to an edge device in a network, wherein the network comprises the edge device and a core device, wherein the core device has access to a plurality of service priority correspondence entries, wherein each correspondence entry indicates a mapping of a service type identifier value and a corresponding priority value, and wherein the method comprises:

receiving, by the edge device from the core device, a first service packet including a service feature information;

extracting, by the edge device from the first service packet, the service feature information;

determining, by the edge device based on the service feature information extracted from the first service packet, a service type identifier that is used to identify a service type of the first service packet; and sending, by the edge device to the core device, the service type identifier, so that the core device:

receives the service type identifier that is used to identify the service type of the first service packet;

determines, in accordance with the plurality of service priority correspondence entries and the received service type identifier, a priority value corresponding to the received service type identifier, establishes a correspondence between the service flow to which the first service packet belongs and the priority value, and forwards, based on the priority value corresponding to the received service type identifier, a second service packet belonging to a same service flow as the first service packet.

14. The method according to claim 13, wherein the method further comprises:

sending, by the edge device in accordance with no service packet belonging to the service flow being received within preset duration, a deletion message to the core device, wherein the deletion message carries a service flow indication.

15. The method according to claim 13, wherein the method further comprises:

ignoring, by the edge device in accordance with the second service packet comprising a priority field, identification of a service type of the second service packet; or ignoring, by the edge device in accordance with a value of a priority field in the second service packet belonging to an identification-free set, identification of a service type of the second service packet.

16. An edge device, wherein the edge device comprises a processor and a memory, the memory stores a program, and the processor is configured to invoke the program stored in the memory, so that the edge device performs the data transmission method according to claim 13.

17. A non-transitory computer-readable storage medium, wherein the computer-readable storage medium stores a computer program; and when the computer program is run on a network device, the network device is enabled to perform the network configuration method according to claim 13.

18. The data transmission method according to claim 13, wherein the service type corresponds to an Apptype.

19. The data transmission method according to claim 18, wherein the service type identifier is provided in an Apptype field of a service type synchronization message sent by the edge device during the sending operation.

20. A data transmission apparatus including a processor, wherein the apparatus is used in an edge device in a network comprising the edge device and a core device, wherein the core device has access to a plurality of service priority correspondence entries, wherein each correspondence entry indicates a mapping of a service type identifier value and a corresponding priority value, and the edge device, wherein the edge device receives, from the core device, a first service packet including a service feature information, wherein the edge device extracts the service feature information from the first service packet, and wherein the apparatus comprises:

an identification module, configured to determine, based on the service feature information extracted from the first service packet, a service type identifier that is used to identify a service type of the first service packet sent from the core device; and a sending module, configured to send the service type identifier to the core device, wherein the service type identifier is used by the core device to determine a priority for a service flow by:

receiving the service type identifier that is used to identify the service type of the first service packet;

determining, in accordance with the plurality of service priority correspondence entries and the received service type identifier, a priority value corresponding to the received service type identifier, and wherein the core device thereafter:

establishes a correspondence between the service flow to which the first service packet belongs and the priority value, and forwards, based on the priority value corresponding to the received service type identifier, a second service packet belonging to a same service flow as the first service packet.

21. The apparatus according to claim 20, wherein the sending module is further configured to:

send, in accordance with no service packet belonging to the service flow being received within a preset duration, a deletion message to the core device, wherein the deletion message carries a service flow indication.

22. The apparatus according to claim 20, wherein the apparatus further comprises a receiving module configured to:

ignore, in accordance with the second service packet comprising a priority field, identification of a service type of the second service packet; or ignore, in accordance with a value of a priority field in the second service packet belonging to an identification-free set, identification of a service type of the second service packet.

23. The data transmission apparatus according to claim 20, wherein the service type identifier corresponds to an Apptype, and wherein the service type identifier is provided in an Apptype field.

24. The data transmission apparatus according to claim 23, wherein the service type identifier is provided in an Apptype field of a service type synchronization message sent by the edge device during the sending operation.

* * * * *